(12) United States Patent
Rajagopal et al.

(10) Patent No.: US 7,194,556 B2
(45) Date of Patent: Mar. 20, 2007

(54) METHOD AND APPARATUS FOR HIGH ACCURACY DISTRIBUTED TIME SYNCHRONIZATION USING PROCESSOR TICK COUNTERS

(75) Inventors: Priya Rajagopal, Hillsboro, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 09/823,070

(22) Filed: Mar. 30, 2001

(65) Prior Publication Data

US 2002/0143998 A1  Oct. 3, 2002

(51) Int. Cl.
*G06F 15/16* (2006.01)

(52) U.S. Cl. ............... 709/248; 713/375; 713/400; 375/354

(58) Field of Classification Search ........ 370/507, 370/335; 713/400, 375; 725/111; 375/240, 375/354, 373; 709/248
See application file for complete search history.

(56) References Cited

U.S. PATENT DOCUMENTS

| | | | | |
|---|---|---|---|---|
| 6,199,169 B1* | 3/2001 | Voth | ............ | 713/400 |
| 6,243,369 B1* | 6/2001 | Grimwood et al. | ......... | 370/335 |
| 6,449,290 B1* | 9/2002 | Willars et al. | ............ | 370/507 |
| 6,611,922 B2* | 8/2003 | Ozcetin et al. | ............ | 713/400 |
| 6,724,825 B1* | 4/2004 | Nemiroff et al. | ...... | 375/240.27 |
| 6,832,326 B2* | 12/2004 | Kubo et al. | ............ | 713/400 |
| 6,944,249 B2* | 9/2005 | Hartman et al. | ............ | 375/373 |
| 2001/0005907 A1* | 6/2001 | Pekonen | ........... | 725/111 |

* cited by examiner

*Primary Examiner*—John Follansbee
*Assistant Examiner*—Dustin Nguyen
(74) *Attorney, Agent, or Firm*—Blakely, Sokoloff, Taylor & Zafman LLP

(57) ABSTRACT

A method and apparatus are provided that allow processing engines to be synchronized to each other with high accuracy. In one embodiment, the invention includes obtaining a processor tick counter value from a first processing engine, comparing the obtained processor tick counter value to a processor tick counter value from a second processing engine and determining a timing offset for synchronizing the first processing engine and the second processing engine using the comparison. The invention may further include obtaining a processor tick counter value by sending a request message from the second processing engine to the first processing engine, and receiving a reply from the first processing engine at the second processing engine. The processor tick counter value at the second processing engine can be determined by recording the time at which the request message is sent and by recording the time at which the reply is received. The invention can further include obtaining a processor frequency from the first processing engine, obtaining a processor frequency from the second processing engine and correcting the timing offset for any difference between the first processing engine frequency and the second processing engine frequency.

20 Claims, 5 Drawing Sheets

METHOD AND APPARATUS FOR HIGH ACCURACY DISTRIBUTED TIME SYNCHRONIZATION USING PROCESSOR TICK COUNTERS

BACKGROUND OF THE INVENTION

1. Field of the Invention

The present invention relates generally to the field of time synchronization of distributed processors. More particularly, the invention relates to the use of processor tick counter values to determine clock offsets to synchronize timing in networks of distributed processors.

2. Description of the Related Art

Accurate time-stamps and accurate timing synchronization are valuable for many different computing tasks in many environments. Current time synchronization protocols typically use the system clock of each computing resource for synchronization. The system clock is typically an independent component that resides on a system bus or a memory bus. The resolution of system clocks is determined by the interrupt cycle of the clock and is typically on the order of one to ten milliseconds. Accordingly, the accuracy of such a synchronization protocol is limited to the order of tens of milliseconds or at best milliseconds.

Higher accuracy can be useful in many different applications. An example of such an application is a network monitoring system which collects important network statistical information from different devices at specific instants in time. The statistics are typically time-stamped and correlated to determine important network characteristics such as latency, link capacity, communications bandwidth, jitter, loss, and interrupt activity. The more accurate the time-stamps, the more reliable the statistics will be. Some network management systems keep a log of events that occur on the distributed systems of the network. The log of events is typically time-stamped and can be very useful, for example, in order to allow a network administrator to infer a chain of events that has led to a particular failure. Higher timing accuracy allows the sequence of the events to be known with greater certainty. It can also facilitate a run-time series analysis at distributed centers. Another example is a networked file management system which requires file systems on the various networked devices to be synchronized and maintained consistent.

Another example of a system that can benefit from high accuracy synchronization is digital document certification. Such certificates can include a time stamp. More accurate time synchronization allows more precise criteria to be applied to the certification, enhancing the accuracy of the certification. Another example is encryption. Many encryption schemes require time-stamping. More accurate time-stamps result in greater encryption security.

Another application of accurate time synchronization is a distributed computing environment in which jobs are distributed among several processors that are networked together. For example a set of different processing engines such as ASICs (Application Specific Integrated Circuits), DSPs (Digital Signal Processors), or microprocessors can be coupled together for parallel processing or distributed processing in a single computer, telecommunications device, network server, or mainframe. A more accurate time stamp allows the jobs to be more closely synchronized, increasing system throughput. The higher the accuracy of the synchronization, the more efficiently the concurrent tasks can be coordinated.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

The present invention allows two separate processing engines, such as microprocessors, for example in two networked computers or in a parallel processing system, to be synchronized with a very high accuracy. The invention can be applied to a variety of systems for a variety of different benefits as discussed above and has a minimal impact on network traffic loads. In one embodiment, the synchronization is applied to microprocessors based on the tick counter of each respective processor. The tick count counter value is maintained in a register of a typical microprocessor and is updated at the speed of the microprocessor. The value can be read from the register with a standard, simple, assembly language instruction. As a result, the value provides very high accuracy commensurate with the processor speed and can be obtained very quickly. For an Intel Pentium® II processor that runs at 233 MHz, synchronization can be obtained with an accuracy on the order of a few nanoseconds. For an Intel Pentium® 4 processor that runs at 1.5 GHz, synchronization can be obtained with an accuracy on the order of half a nanosecond.

Figure 1:
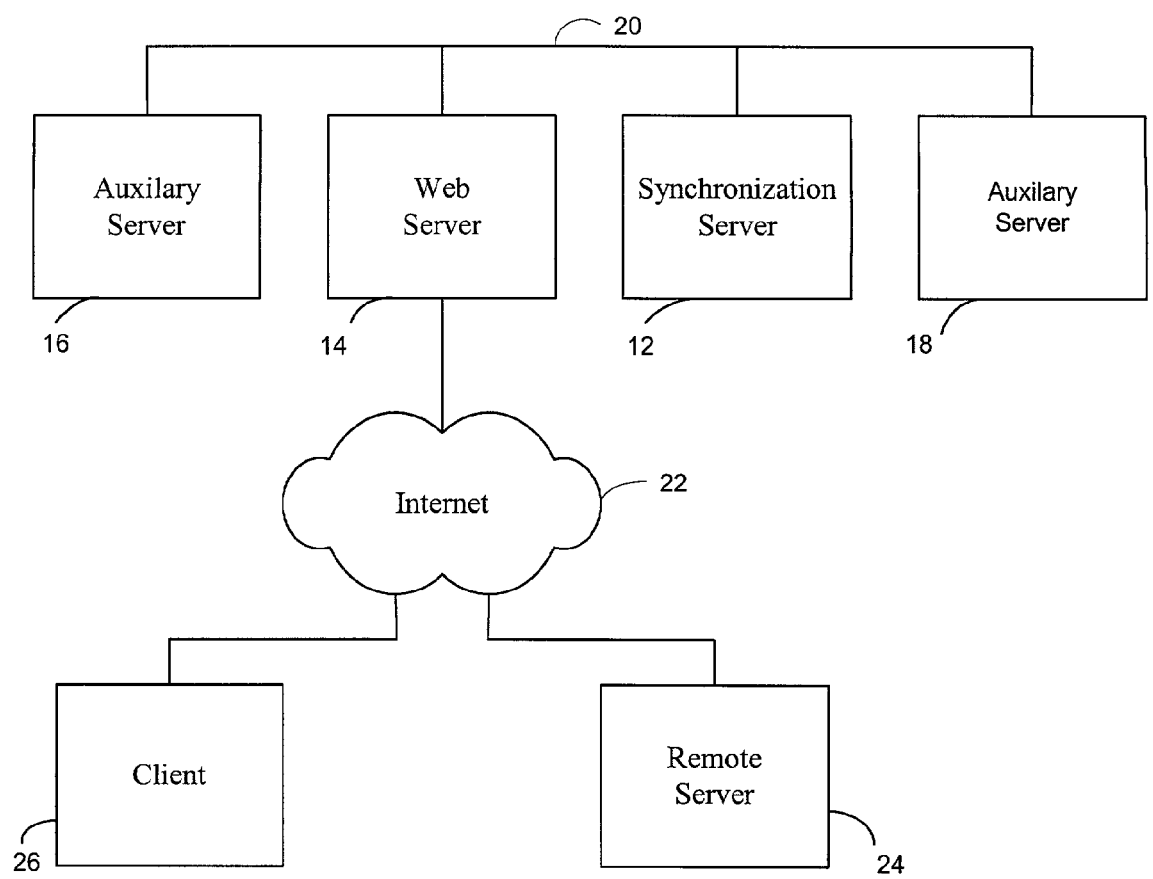
FIG. 1 is a block diagram of a computer network suitable for implementing the present invention.

FIG. 1 shows a network system in which several computers are connected together to share processing tasks. One of the computers is assigned to be a timing synchronization server 12. Its timing is assigned to be the master clock to which all of the other computers are slaved. The timing synchronization server may also perform many other functions that are unrelated to the timing synchronization tasks discussed herein. The system also includes a web server 14, and two auxiliary servers 16, 18. These servers are slave servers which are synchronized to the master 12. In one embodiment, the servers are all conventional Intel Pentium® II and III based microcomputers and server appliances acquired from a variety of different hardware vendors running a Microsoft Windows® NT operating system and connected by Ethernet. However, the present invention can be applied to a network of any type of processing engines coupled together as discussed in the examples provided above. The choice of operating system is not important nor does the present invention require an operating system. As is well-known in the art, there are many different software methods to read a value from the processor tick counter or similar high speed refresh register. Many of these methods do not require an operating system.

The master and the slave servers are coupled together with a network communications bus 20 which can be any type of wired or wireless network using any acceptable protocol. In the example of FIG. 1, the computers are connected through an Ethernet to form a local area network (LAN). For a parallel processing device, the processors may be coupled together using a local system bus. The LAN is used, for example, at a web server site to provide web services over the Internet.

Accordingly, the web server 14 connects the LAN through the Internet 22 to a remote server 24 and a client 26. The remote server can be used to provide additional services to the client such as authentication, billing or advertising services that are not provided by the servers on the network. While the example of FIG. 1 shows a network of servers to be synchronized, the invention can also be applied to many different system architectures in which separate processors can be synchronized. Such environments include other computer processing farms, parallel processors in a single computer and peers on the illustrated or another type of network. The processors can be in a server-client, mainframe-terminal, peer-peer or any other type of configuration. In addition, it is not necessary that the timing master serve as a master for any other functions. The timing master may be a slave, terminal or client to the other processors for any or all functions other than timing.

The timing master can also operate as a source of synchronization across larger networks such as WANs (wide area networks), intranets and across the Internet, for example, to synchronize remote server 24 or client 26. In another embodiment, the timing master can synchronize one or more timing slaves which then serve as timing masters for further timing slaves and so on, so that the master timing is cascaded through a hierarchy of timing servers and slaves across a large number of machines.

Figure 2:
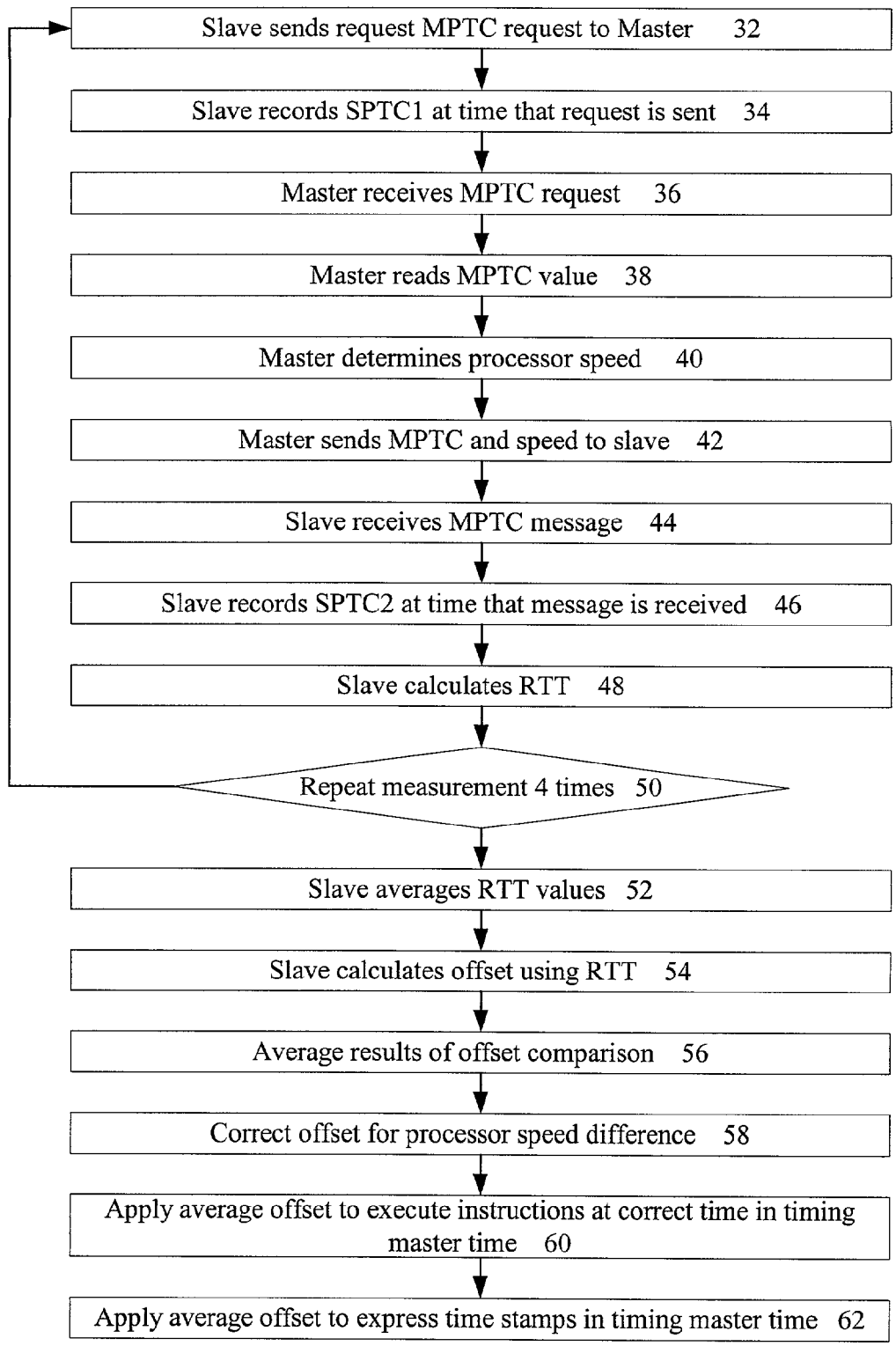
FIG. 2 is a flow chart showing a process for synchronizing devices on a network.

FIG. 2 shows a flow chart of an example of synchronizing a timing slave, client or processor 14, 16, 18, 24, or 26, to a master timing terminal or processor 12 according to one embodiment of the present invention. In FIG. 2, the process is driven by the timing slave. Any or all of the steps may be reversed so that they are performed by the timing master. A timing slave will begin synchronization with the master by sending a request message 32 to the timing master 12 using the communications link 20, 22 over which they are both connected. In one embodiment, this request is for the timing master to read the value in the timing master's processor tick counter, determine its processor speed and send these values to the slave. The processor tick counter typically resides in the microprocessor of the timing master and is updated at a rate corresponding to the processor's speed or frequency based on the much slower system clock. With, for example, a Pentium® III microprocessor available from Intel Corporation of Santa Clara, Calif., the tick count is stored in a 64-bit register on the microprocessor. The register value is updated at the, for example, 300 to 1000 megahertz frequency rate of the microprocessor.

The timing slave when sending the message will record its own tick counter value 34 at that time. This first value of the slave's processor tick counter value will be referred to as SPTC1. This value is stored in a register for later reference as described below. The master, upon receiving the request 36, immediately responds by reading its processor tick counter value 38 (MPTC) packaging the value into a message with its processor speed and sending the message back to the slave 42. Alternatively, if the response is delayed, the timing master can indicate the amount of delay in its response. The slave will then adjust its calculations accordingly. The MPTC may be packaged along with any other data related to any other type of network management or administration or it may be sent alone. As with the request, the MPTC message, like the MPTC request will be sent in accordance with the standards and protocols that are standard for the particular bus that connects the processors.

In some networks, it may happen that the master and slave operate at different processor speeds or frequencies. As a result, the tick counter values will cycle at correspondingly different speeds. In order to use the tick counter value to synchronize timing, this difference in speed will be taken into account. The network can be configured so that timing slaves know the processor speed of the timing master. Alternatively, the slave can request the processor speed value from the master at the time that it sends the tick counter value request. If the request includes a request for the master processor speed, then the master will determine this value 38 and include that in the message that it sends to the slave 42. In this way, the network can be synchronized without any initial knowledge of the devices on the network. In addition, devices can be modified or replaced without upsetting the ability of the network to synchronize. The processor speed or clock rate can be determined by the timing master in advance so that it is ready to send to timing slaves on request.

The processor speed can be determined by retrieving the processor tick counter value at two different times spaced apart by a few milliseconds. The difference between the two retrieved counter values can then be compared to the time elapsed between the two to obtain a processor frequency in Hertz. For greater accuracy, the process can be repeated several times and averaged. This process can be performed autonomously by any processor in advance of receiving a tick counter value request. It can also be done in response to a specific request. Alternatively, the Intel Processor Frequency ID Utility can be used. This utility is available for download from Intel Corporation at http ://www.intel.com/support/processors/tools/frequencyid/24659.htm.

The slave will receive the MPTC and processor speed message from the master 44 and again read the current value in its own processor tick counter register at the time that the message is received 46. The value at the second reading of the slave processor tick counter value will be called SPTC2. By comparing the two processor tick counter values (SPTC1, SPTC2), the one at the time of sending the message to the master and the one at the time of receiving the message from the master, the slave can determine the number of its own processor tick counts that occurred during the interval 46. Based on this number it can calculate a round trip time for the message to go from the slave to the master and back again 48. The round trip time (RTT) corresponds to the number of processor tick counts for the message to travel from the slave to the master and back. The number of processor tick counts can be converted into standard units such as microseconds if the processor clock frequency is known or it can be used as is in units of processor tick counts.

For processors with varying clock speeds, the clock speed should be monitored during the round trip of the message and the number of processor tick counts should be normalized. The clock speed can be monitored by running the processor frequency algorithm mentioned above or the Processor Frequency ID Utility at regular intervals and recording the results. The normalization can be, for example, either to a standard processor tick rate or to a standard unit such as microseconds.

The round trip time can be expressed as: RTT=|SPTC1−SPTC2|. Note that the content or substance of the message from the timing master (MPTC) is used in determining the synchronization offset but is not necessary to determine the round trip time. It is important only that the message result in a response being returned to the slave from the master. For RTT, the message from the timing master may accordingly contain any other data or no data at all. As mentioned above SPTC1 and SPTC2 correspond to a time at which a message is sent and received, respectively. The exact time of sending and receiving need not be precisely defined, provided that readings of SPTC1 and SPTC2 are done consistently. Alternatively, the readings can be normalized or scaled to provide a consistent result. Since the processor tick counter value can be read using a standard assembly language instruction, the amount of time required to obtain the value is very small as is the amount of time required to send the MPTC request to the timing master.

In some networks, the time that it takes a message to travel across the network varies over time and with different messages. The variation can depend upon the network traffic at the time. It can depend upon the processor load at each processor. It can depend upon whether any interrupts occurred in the path or it can depend on a number of other factors. Such other factors include the network being down or having components pulled off the wire. Many of these variations can be compensated for by repeating steps 32–46 discussed above with respect to FIG. 2 and analyzing the results. In one embodiment, the messages propagate with no interrupts and only minor traffic variations affect the round trip time of messages. Accordingly, to accurately determine round trip time, the measuring cycle of sending and receiving and comparing the slave processor tick counter value can be repeated three or four times 50. The three or four results can be averaged to obtain a suitably accurate value 52. As discussed below statistical processing more complex than averaging can be performed.

In one embodiment, measurements of RTT are made and the results are compared to each other. The measurements are repeated until the RTT values become consistent. Consistency can be measured, for example, by a threshold or by a standard deviation. The minimum RTT value from within this group of consistent measurements can be taken as the RTT value for further processing. Stated another way, the RTT measurements can be compared and any extreme values discarded. The minimum of the values remaining can then be selected as the RTT.

In another embodiment, the messages can be affected by an interrupt which will significantly affect the round trip time. In such an embodiment four or five measurements are made. The measurements are then compared. Any measurements that are influenced by an interrupt can be identified as significantly greater than the others. There are a variety of ways to perform this comparison, for example, the minimum measurement can be identified and any measurement that exceeds the minimum by more than a threshold amount can be rejected.

In another embodiment, an average round trip time can be calculated after each measurement. The averages can then be compared for deviation. As the averages converge with each measurement, the measurements can stop once the averages converge to within a threshold amount. More sophisticated approaches can be used based on iteration, standard deviation and other statistical methods as is understood by those of average skill in the art. The particular statistical processing to be applied as well as the number of measurements to be made will depend upon the nature of the communications bus and the way that these messages are handled by the master and slave processors.

Once a round trip time is determined, it can be applied to compare the master processor tick counter value received from the timing master to the slave processor tick counter value. From this comparison, an offset can be determined. The offset can be used to convert any master processor tick counter value to a corresponding slave processor tick counter value. The offset can be computed by comparing the received MPTC to the SPTC1 or SPTC2 corrected for the one-way travel time of the message containing the MPTC from the master to the slave. This one-way travel time is half the round trip time (RTT/2). The offset can be used if, for example, a command is issued to execute an instruction at a particular time based on the master processor tick counter value. It can also be used to generate a time stamp in a network administration system that is expressed in terms of master timing instead of slave timing.

Using the received MPTC and the round trip time (RTT), the slave can compute the offset between its processor tick counter and that of the timing master 54. In one embodiment, the offset is determined by: |MPTC−SPTC2−(RTT/2)|. In this embodiment, the SPTC1, SPTC2, MPTC and RTT can be in values of processor tick counts. Alternatively, the values can be converted into seconds or any other units that indicate time. Accordingly, the offset is in units of processor tick counts and will allow the direct translation between master timing in processor tick counts and slave timing in processor tick counts. The offset can be alternatively determined using SPTC1. Note that this calculation of the offset assumes that the propagation time for a message from the slave to the master is the same as the propagation time from the master to the slave. Accordingly, (RTT/2) is the elapsed time between the time when the MPTC was read and the time when the SPTC was read. Empirically, it has been determined that this assumption is valid for the example provided above. If this is not a valid assumption for a particular network, then appropriate adjustments can be made.

Consider an example in which the MPTC is returned as 1000, the SPTC1 is 300 and the SPTC2 is 350. The RTT is (350−300)/2=25. The offset is 1000−350−25=625. Accordingly, every instruction that is to be executed or every time stamp to be made in timing master time can be counted by slave processor tick counter time corrected by the 625 processor tick count difference. In other words, to get an instruction execution time, the slave reads the instruction time that is based on master timing tick counts and subtracts 625. It then executes the instruction 60 when its processor tick counter reaches the result. To get a proper time stamp, the slave reads its processor tick counter value and adds 625. It then time stamps messages with a time that is related to the timing master 62.

Finally, the repeated requests for the MPTC described above to enhance the RTT determination can also be used to enhance the accuracy of the offset determination. Using the multiple cycles of requesting MPTC in steps 32–44, the offset calculation can be repeated several times and the result averaged 56. The number of measurements will depend on the nature of the network. In one embodiment, an average is repeated after each measurement and the averages are compared. When the averages have converged to a sufficient degree, then the measurements are stopped and the last average is taken as the offset. Empirically, it has been found that three to five measurements are sufficient to obtain an offset that is accurate to within a few nanoseconds of the actual value. The offset measurements are taken from the RTT determination of steps 32–44 and since this is repeated several times 50, the offset measurement is also repeated several times and no separate offset measurement is necessary.

As mentioned above, the timing master and the timing slave may well operate at different processor frequencies or speeds. Accordingly, it may be necessary to correct the offset determination for this clock skew. For example, the timing slave may have a Pentium® III processor that runs at 500 MHz and the timing master may have a Pentium® III processor that runs at 1 GHz. As a result, the processor tick counter is updated twice as fast by the master as it is by the slave. The processor speeds have been determined already in steps discussed above.

Using the example above where the MPTC is 1000 and SPTC2 was 350, the difference in processor speed can quickly be accommodated. One way is to divide all MPTC values in half, one half being the ratio of the processor speeds in this example. Accordingly, MPTC/2 is 500, the corrected timing offset in terms of slave tick counter time is 500−350−25=125. This corrected timing offset can be used as discussed above to correct instruction execution times 60 and to correct time stamps 62. Instruction execution times in timing master tick counter values are first divided by the speed ratio, e.g. one half, then corrected for the offset, e.g. 125. Time stamps are measured in terms of slave tick counts, corrected for the offset and corrected for the speed ratio. The computed corrected offset is applied to all operations which are normalized to master timing. This can include time stamps 82, message labeling, instruction execution 84 and any other synchronized activity.

The offset determination can be repeated to accommodate drift in the respective processors' frequencies and system clocks that may be caused by temperature, power supply variations or variations in the clocks. It has been found that in at least one network of Intel Pentium® II and III processor based machines, the offset should be recalculated every 8–24 hours. This provides synchronization that is accurate to within a few nanoseconds. The necessary number of repetitions will depend on the environment in which the machines are operated and many other factors. The optimal amount of time for recalculation should be determined for each network and each environment.

While offset may need to be re-determined daily or more often, the round trip time (RTT) is typically more stable. In many networks, the round trip time will not change significantly as long as the configuration of the network is not changed. Accordingly, the round trip time may not need to be re-determined for several days of network operation. In such a case, once the RTT measurements have been made, normalized and statistically processed, the round trip time can be stored and applied again later for re-use. Unnecessary re-determination of the round trip time may burden the network with undesired overhead, accordingly, the number of round trip time calculations can be minimized.

The best frequency for round trip time determinations will vary from network to network. This frequency can be determined analytically empirically. In some networks, the round trip time may vary with traffic and other fluctuations in network use. In such an embodiment, it may be better to re-determine the round trip time every time an offset measurement is made.

Figure 3:
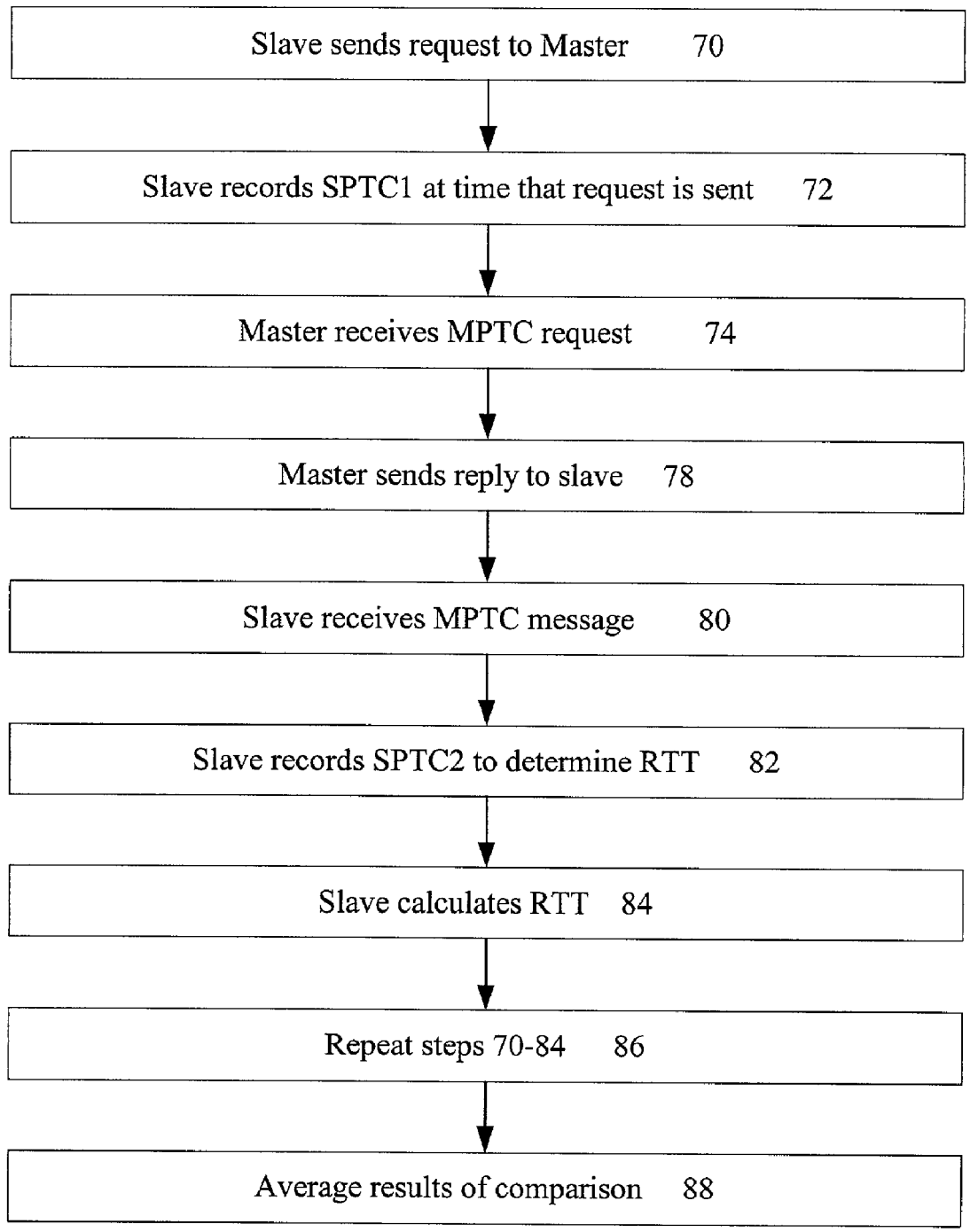
FIG. 3 is a flow chart showing a process for determining a round trip time.

FIG. 3 shows a process for determining a RTT (round trip time) that can be used for calculating an offset for synchronizing connected processors. In the example of FIG. 3, the offset is not determined. The messages are used only to determine the RTT. Since RTT is typically relatively stable, the RTT can be determined in advance and then applied to later offset calculations. The slave first sends a request to the timing master 70. The request can be for a reading of the MPTC or simply a response. The content of the reply message is not important to the RTT determination. The slave records the time SPTC1 at which the message is sent 72 and the time at which a response is received 82. In both cases, the time is recorded by reading the value from the timing slave's processor tick counter and storing it in a register for that purpose. The master will receive the request from the slave 74 and, in response, the master sends back a reply to the timing slave 78, which receives the message 80 and records its processor tick counter value SPTC2 at the time that the message is received 82.

As mentioned above, the difference between SPTC1 and SPTC2 are used to calculate the RTT measurement 84. The process is then typically repeated a few times, e.g. three or four 86 and the results are averaged 88. Alternatively, the lowest RTT value can be selected. The simple RTT determination process of FIG. 3 consumes less network and processor resources than the more complicated process of FIG. 2 that also determines RTT.

Figure 4:
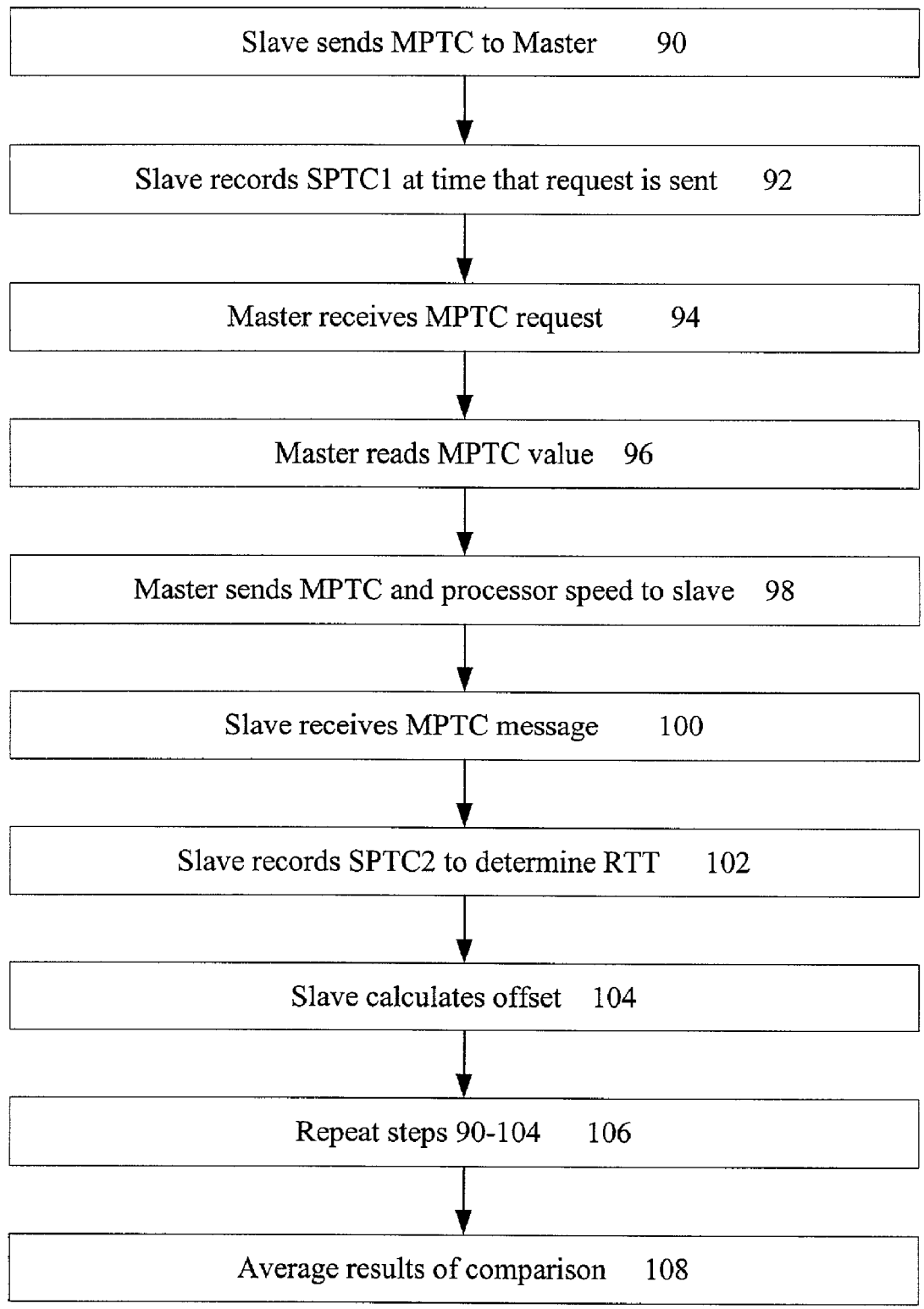
FIG. 4 is a flow chart showing a process for synchronizing devices after a round trip time has been determined.
Figure 5:
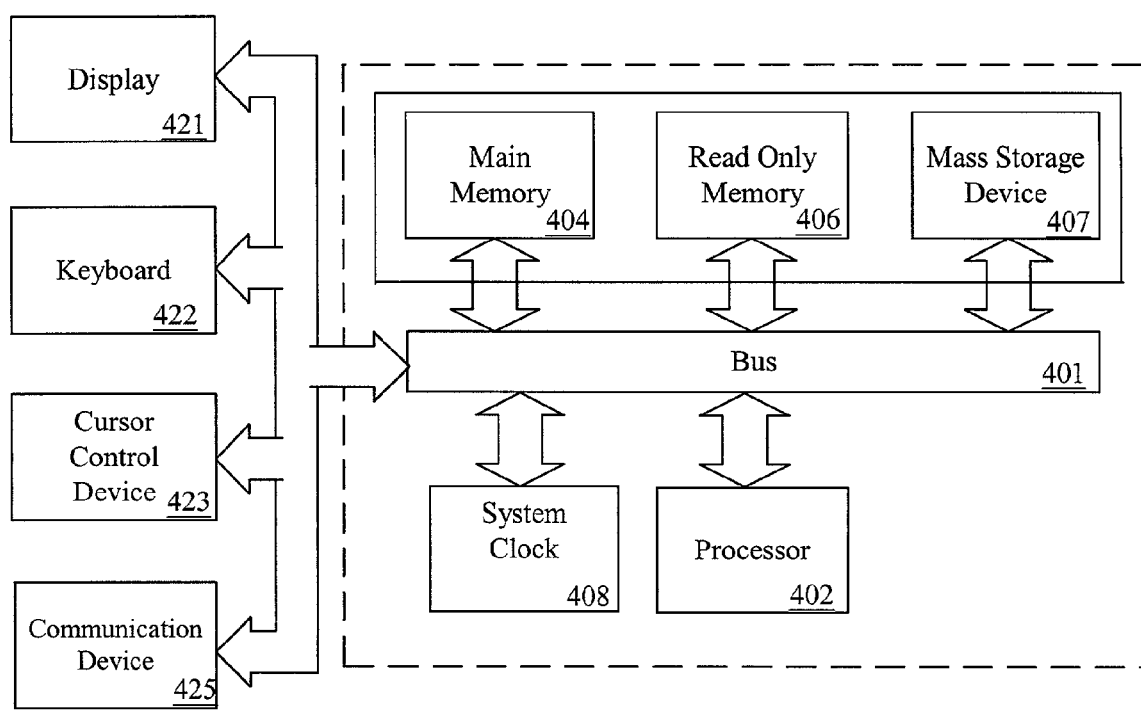
FIG. 5 is an example of a typical computer system of a computer network of FIG. 1 upon which one embodiment of the present invention may be implemented.

FIG. 4 shows a process for determining a synchronization offset that can be used for synchronizing processors in a network. In the example of FIG. 4, the RTT is already determined, using for example, the process of FIG. 3. The messages are used only to determine the offset. The slave first sends an MPTC request to the timing master 90. The slave then either records the time SPTC1 at which the message is sent 92 or the time at which a response is received 102 or both. Since RTT is already known, only one of these recordings is necessary. In either event, the time is recorded by reading the value from the timing slave's processor tick counter and storing it in a register for that purpose. The master will receive the request from the slave 94 and, in response, the master reads its MPTC value 96. The master then sends its MPTC and processor speed, if requested, to the timing slave 98, which receives the MPTC message 100 and records its processor tick counter value SPTC2 at the time that the message is received 102.

As mentioned above, the difference between the MPTC and either the SPTC1 or SPTC2 are used to calculate an offset measurement 104. The process is then typically repeated a few times, e.g. three or four 106 and the results are averaged 108. Alternatively, the lowest offset value can be selected. The simpler offset re-determination process of FIG. 4 consumes less network and processor resources than the more complicated process of FIG. 2 that also determines RTT. The process of FIGS. 3 and 4 can be used as an alternate to FIG. 2 to reduce the amount of resources used at any one time. In any network, it is probably appropriate to redetermine RTT from time-to-time so while the process of FIG. 3 can be used primarily, the process of FIG. 2 or 3 complements the process of FIG. 4 in a typical system.

A computer system 400 representing an example of a system upon which features of the present invention may be implemented is shown in FIG. 4. The servers of FIG. 1 will typically be configured similar to what is shown in FIG. 4. The computer system 400 includes a bus or other communication means 401 for communicating information, and a processing means such as a microprocessor 402 coupled with the bus 401 for processing information. The tick counter and register holding the tick counter value are typically a part of the microprocessor 402. The computer system 400 further includes a main memory 404, such as a random access memory (RAM) or other dynamic data storage device, coupled to the bus 401 for storing information and instructions to be executed by the processor 402. The main memory also may be used for storing temporary variables or other intermediate information during execution of instructions by the processor.

The computer system may also include a nonvolatile memory 406, such as a read only memory (ROM) or other static data storage device coupled to the bus for storing static information and instructions for the processor. A mass memory 407 such as a magnetic disk or optical disc and its corresponding drive may also be coupled to the bus of the computer system for storing information and instructions.

The computer system includes a system clock 408 coupled to the bus that determines the date and time that are used for scheduled events performed by any of the devices of the computer system that have access to the bus. The system clock is accurate to within a few milliseconds and has been used to synchronize timing between different processors.

The computer system can also be coupled via the bus to a display device or monitor 421, such as a cathode ray tube (CRT) or Liquid Crystal Display (LCD), for displaying information to a user. For example, graphical and textual indications of installation status, operations status and other information may be presented to the user on the display device. Typically, an alphanumeric input device 422, such as a keyboard with alphanumeric, function and other keys, may be coupled to the bus for communicating information and command selections to the processor. A cursor control input device 423, such as a mouse, a trackball, or cursor direction keys can be coupled to the bus for communicating direction information and command selections to the processor and to control cursor movement on the display 421.

A communication device 425 is also coupled to the bus 401. The communication device 425 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

It is to be appreciated that a lesser or more equipped computer system than the example described above may be preferred for certain implementations. Therefore, the configuration of the exemplary computer system 400 will vary from implementation to implementation depending upon numerous factors, such as price constraints, performance requirements, technological improvements, or other circumstances.

It should be noted that, while the steps described herein may be performed under the control of a programmed processor, such as the processor 402, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to synchronizing networked Internet servers, the method and apparatus described herein are equally applicable to coprocessors and to peers on any other type of network, intranet, Internet, LAN, WAN and mobile wireless networks. In addition, while the invention has been described in terms of a processor tick counter, any other register that is readily accessible and that is updated at a consistent and high speed much greater than the system clock can be used. Other types of processing engines, such as ASICs, FPGAs and DSPs may contain similar types of registers which go by different names.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
   obtaining a processor tick counter value from a first processing engine;
   comparing the obtained processor tick counter value to a processor tick counter value from a second processing engine;
   determining a timing offset using the comparison; and
   sending the timing offset to the first processing engine to apply to the execution of instructions by the first processing engine which are normalized to the timing of the second processing engine.

2. The method of claim 1, wherein obtaining a processor tick counter value comprises sending a request message from the second processing engine to the fast processing engine, and receiving a reply from the first processing engine at the second processing engine.

3. The method of claim 2, wherein the processor tick counter value at the second processing engine is determined by recording a time at which the request message is sent.

4. The method of claim 2, wherein the processor tick counter value at the second processing engine is determined by recording a time at which the reply is received.

5. The method of claim 2 further comprising repeating sending a request message, recording a time, receiving a reply, recording a time and determining a timing offset until the determined timing offsets are within a predetermined variability range.

6. The method of claim 1 further comprising applying a time stamp to a message sent from the second processor, the time stamp being determined by applying the determined timing offset.

7. The method of claim 1 further comprising receiving an instruction having an execution time and interpreting the execution time by applying the determined timing offset.

8. The method of claim 1, further comprising:
  obtaining a processor frequency from the first processing engine;
  obtaining a processor frequency from the second processing engine; and
  correcting the timing offset for any difference between the first processing engine frequency and the second processing engine frequency.

9. A machine-readable medium having stored thereon data representing sequences of instructions which, when executed by a machine, cause the machine to perform operations comprising:
  obtaining a processor tick counter value from a first processing engine;
  comparing the obtained processor tick counter value to a processor tick counter value from a second processing engine;
  determining a timing offset using the comparison; and
  sending the timing offset to the first processing engine to apply to the execution of instructions by the first processing engine which are normalized to the timing of the second processing engine.

10. The machine-readable medium of claim 9, wherein the instructions for obtaining a processor tick counter value comprise further instructions which, when executed by the machine, cause the machine to perform further operations comprising sending a request message from the second processing engine to the first processing engine and receiving a reply from the first processing engine at the second processing engine.

11. The machine-readable medium of claim 10, further comprising instructions which, when executed by the machine, cause the machine to perform further operations comprising determining the processor tick counter value at the second processing engine by recording a time at which the request message is sent.

12. The machine-readable medium of claim 10, further comprising instructions which, when executed by the machine, cause the machine to perform further operations comprising determining the processor tick counter value at the second processing engine by recording a time at which the reply is received.

13. The machine-readable medium of claim 9, further comprising instructions which, when executed by the machine, cause the machine to perform further operations comprising:
  obtaining a processor frequency from the first processing engine;
  obtaining a processor frequency from the second processing engine; and
  correcting the timing offset for any difference between the first processing engine frequency and the second processing engine frequency.

14. A synchronized computing network comprising:
  a first processing engine having a processor tick counter;
  a second processing engine having a processor tick counter;
  a communications link to send a value from the processor tick counter of the first processing engine to the second processing engine at one time;
  a processor of the second processing engine to compare the processor tick counter value from the first processing engine to a processor tick counter value from the second processing engine, to determine a timing offset using the comparison, and to apply the timing offset to the execution of instructions by the first processing engine which are normalized to the timing of the second processing engine.

15. The synchronized computing network of claim 14, wherein the first processor sends the processor tick counter value as a reply to a request message from the second processing engine.

16. The synchronized computing network of claim 15, wherein the processor tick counter value at the second processing engine is determined by recording a time at which the request message is sent.

17. The synchronized computing network of claim 15, wherein the processor tick counter value at the second processing engine is determined by recording a time at which the reply is received.

18. The synchronized computing network of claim 14, wherein the first processing engine and the second processing engine run at different frequencies and wherein the processor corrects the timing offset for the difference between the first processing engine frequency and the second processing engine frequency.

19. The synchronized computing network of claim 14, wherein the processor of the second processing engine applies a time stamp to a message sent from the second processing engine, the time stamp being determined by applying the determined timing offset.

20. The synchronized computing network of claim 14, wherein the processor of the second processing engine executes an instruction at a time based on the determined timing offset.

* * * * *

UNITED STATES PATENT AND TRADEMARK OFFICE
CERTIFICATE OF CORRECTION

PATENT NO. : 7,194,556 B2
APPLICATION NO. : 09/823070
DATED : March 20, 2007
INVENTOR(S) : Rajagopal et al.

It is certified that error appears in the above-identified patent and that said Letters Patent is hereby corrected as shown below:

In column 10, at line 67, delete "fast" and insert --first--.

Signed and Sealed this

Eighth Day of April, 2008

JON W. DUDAS
*Director of the United States Patent and Trademark Office*